United States Patent
Bernhard et al.

(10) Patent No.: US 9,247,539 B2
(45) Date of Patent: Jan. 26, 2016

(54) CONCEPT FOR BIDIRECTIONAL DATA TRANSMISSION BETWEEN A BASE STATION AND A NODE

(71) Applicant: FRAUNHOFER-GESELLSCHAFT ZUR FOERDERUNG DER ANGEWANDTEN FORSCHUNG E.V., Munich (DE)

(72) Inventors: Josef Bernhard, Nabburg (DE); Gerd Kilian, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 19 days.

(21) Appl. No.: 14/195,288

(22) Filed: Mar. 3, 2014

(65) Prior Publication Data

US 2014/0192789 A1    Jul. 10, 2014

Related U.S. Application Data

(63) Continuation of application No. PCT/EP2012/066908, filed on Aug. 30, 2012.

(30) Foreign Application Priority Data

Sep. 2, 2011   (DE) .................. 10 2011 082 100

(51) Int. Cl.
*H04J 3/00* (2006.01)
*H04W 72/04* (2009.01)
(Continued)

(52) U.S. Cl.
CPC ......... *H04W 72/0446* (2013.01); *H04L 5/0078* (2013.01); *H04W 56/0015* (2013.01)

(58) Field of Classification Search
CPC .............. H04W 56/0035; H04W 56/0065; H04L 27/2655; H04L 27/2646; H04L 27/2657; H04L 2027/0022; H04L 2027/002; H04L 27/2675; H04L 27/2662; H04L 27/2613
See application file for complete search history.

(56) References Cited

U.S. PATENT DOCUMENTS

| 5,450,617 A | 9/1995 | Moore |
| 5,794,119 A | 8/1998 | Evans et al. |

(Continued)

FOREIGN PATENT DOCUMENTS

| DE | 60216055 | 6/2007 |
| EP | 1168617 A2 | 1/2002 |

OTHER PUBLICATIONS

Dahlmann, et al., "3GEvolution: HSPA and LTE for Mobile Broadband passage", 3G Evolution: HSPA and LTE for Mobile Broadband, Academic Press, the Netherlands, Jun. 1, 2008, pp. 490-495.
Iltis, et al., "GENO5-4: Carrier Offset and Channel Estimation for Cooperative MIMO Sensor Networks", IEEE Global Telecommunications Conference, Nov. 1, 2006, pp. 1-5.

(Continued)

*Primary Examiner* — Jung-Jen Liu
(74) *Attorney, Agent, or Firm* — Michael A. Glenn; Perkins Coie LLP

(57) ABSTRACT

Embodiments of the present invention provide a base station including bidirectional data transmission to a node. The base station has a receiver for receiving a data packet transmitted by the node at a node transmission frequency, the node transmission frequency being derived from a frequency generator of the node. In addition, the base station has a determiner for determining the node transmission frequency based on the data packet received and for determining a deviation of the frequency generator of the node based on a frequency deviation between the determined node transmission frequency and a set node transmission frequency associated to the node. Furthermore, the base station has a transmitter for transmitting a data packet to the node at a base station transmission frequency, the transmitter for transmitting the data packet being configured to set the base station transmission frequency based on the determined deviation of the frequency generator of the node.

6 Claims, 11 Drawing Sheets

(51) Int. Cl.
*H04W 56/00* (2009.01)
*H04L 5/00* (2006.01)

(56) References Cited

U.S. PATENT DOCUMENTS

| | | |
|---|---|---|
| 6,452,948 B1 | 9/2002 | McCallister et al. |
| 7,751,448 B2 | 7/2010 | Laroia et al. |
| 2004/0067741 A1* | 4/2004 | Fei et al. .................... 455/192.1 |
| 2006/0072586 A1 | 4/2006 | Callaway, Jr. et al. |
| 2007/0159321 A1 | 7/2007 | Ogata et al. |
| 2008/0039023 A1 | 2/2008 | Ward |
| 2010/0008458 A1* | 1/2010 | Jiang et al. .................... 375/371 |
| 2010/0027723 A1* | 2/2010 | Kim et al. .................... 375/343 |
| 2013/0329721 A1* | 12/2013 | Doetsch et al. .............. 370/350 |

OTHER PUBLICATIONS

LG Electronics, "Considerations on interference coordination in heterogeneous networks", 3GPP Draft; R1-101369 Interference Coordination in Hetnet V2, 3rd Generation Partnership Project (3GPP), Mobile Competence Centre, France, Feb. 16, 2010, 6 pages.

Mitsubishi Electric, "CoMP in heterogeneous network deployment", 3GPP Draft: R3-092539 (COMP_FOR_HETNET) 3rd Generation Partnership Project (3GPP), Mobile Competence Centre, France, Oct. 12, 2009, 4 pages.

QUALCOMM Europe, "Synchronization Requirements and Techniques", 3GPP Draft: R4-091336, 3rd Generation Partnership Project (3GPP), Mobile Competence Centre, France, Mar. 19, 2009, 4 pages.

Simeone, et al., "Distributed synchronization in wireless networks", IEEE Signal Processing Magazine, vol. 25, No. 5, New Jersey, USA, Sep. 1, 2008, pp. 81-97.

* cited by examiner under section 301 of Title 17 of the U.S. Code.

CONCEPT FOR BIDIRECTIONAL DATA TRANSMISSION BETWEEN A BASE STATION AND A NODE

CROSS-REFERENCE TO RELATED APPLICATIONS

This application is a continuation of copending International Application No. PCT/EP2012/066908, filed Aug. 30, 2012, which is incorporated herein by reference in its entirety, and additionally claims priority from German Application No. 102011082100.7, filed Sep. 2, 2011, which is also incorporated herein by reference in its entirety.

BACKGROUND OF THE INVENTION

Embodiments of the present invention relate to a concept for bidirectional data transmission between a base station and a node. Further embodiments of the present invention relate to a base station including bidirectional data transmission to a node. Further embodiments of the present invention relate to an optimized bidirectional base station-node telemetry system.

When transmitting small amounts of data from a large number of nodes to a base station, such as, for example, sensor data of heating, electricity or water meters, and when transmitting control information from the base station to the nodes, such as, for example, when switching on/off devices, a radio transmission system may be used. Here, the base station receives and controls a large number of nodes.

There are different unidirectional and bidirectional systems for transmitting data between the base station and the nodes. Known systems are, for example, DECT (digital enhanced cordless telecommunications) and RFID (radio frequency identification). Typical of these systems is the fact that the base station sets a reference frequency and a reference time which the nodes synchronize to. Exemplarily, in RFID systems, a reader (base station) sets a time window, which follows directly after being sent out, within which the RFID transponders (nodes) randomly choose a time for responding. The predetermined time interval is additionally subdivided into time slots of equal length. This is called a slotted ALOHA protocol. In DECT, time slots are provided within a fixed predetermined pattern. Here, the base station associates to a participant an exact time slot which it may use for communication. Due to the inaccuracy caused by the quartz tolerance, a buffer time is provided in between the time slots in order for the data packets not to overlap.

The object underlying the present invention is providing a concept which allows increasing the range and/or data transmission rate or channel capacity (number of participants or users).

SUMMARY

According to an embodiment, a base station including bidirectional data transmission to a node may have: means for receiving a data packet transmitted by the node at a node transmission frequency, the node transmission frequency being derived from a frequency generator of the node; means for determining the node transmission frequency based on the data packet received and for determining a deviation of the frequency generator of the node based on a frequency deviation between the determined node transmission frequency and a set node transmission frequency associated to the node; means for transmitting a data packet to the node at a base station transmission frequency, the means for transmitting the data packet being configured to set the base station transmission frequency based on the determined deviation of the frequency generator of the node; wherein the means for transmitting the data packet is configured to tune the base station transmission frequency to a node receiving frequency based on the determined deviation of the frequency generator of the node, the node receiving frequency being derived from the frequency generator of the node.

According to another embodiment, a system for bidirectional data transmission may have: a base station as mentioned in the above paragraph; and a node, the node having means for transmitting the data packet to the base station at the node transmission frequency and means for receiving the data packet from the base station, the means for receiving the data packet from the base station having a receiving filter having a bandwidth of less than 0.1% of the carrier frequency.

According to still another embodiment, a base station including bidirectional data transmission to a node may have: means for receiving a data packet transmitted by the node at a node transmission point in time, the node transmission point in time being derived from a timer of the node; means for determining the node transmission point in time based on the data packet received and for determining a time deviation of the timer of the node based on a time deviation between the determined node transmission point in time and a set node transmission point in time associated to the node; means for transmitting a data packet to the node, the data packet having the determined time deviation of the timer of the node or a correction value derived therefrom; wherein the means for receiving the data packet transmitted by the node at the node transmission point in time is configured to receive a further data packet transmitted by the node at a further node transmission point in time, the further node transmission point in time being derived from the timer of the node; wherein the means for determining the node transmission point in time is configured to determine the further node transmission point in time based on the further data packet, the means for determining the time deviation of the timer of the node being configured to determine a further time deviation between the determined further node transmission point in time and a further set node transmission point in time associated to the node and to determine a clock deviation of the timer of the node based on the time deviation and the further time deviation; and wherein the means for transmitting the data packet to the node is configured to transmit the data packet to the node at the determined clock deviation of the timer or having a correction value derived therefrom.

According to another embodiment, a system including bidirectional data transmission may have: a base station as mentioned in the above paragraph; and a node, the node having means for transmitting the data packet to the base station at the node transmission point in time and means for receiving the data packet from the base station, the means for transmitting the data packet being configured to set the node transmission point in time to the set node transmission point in time based on the determined deviation of the timer or the correction value derived therefrom.

According to another embodiment, a method for bidirectional data transmission between a base station and a node may have the steps of: receiving a data packet transmitted by the node at a node transmission frequency, the node transmission frequency being derived from a frequency generator of the node; determining the node transmission frequency based on the data packet received and determining a deviation of the frequency generator of the node based on a frequency deviation between the determined node transmission frequency and a set node transmission frequency associated to the node;

and setting a base station transmission frequency based on the determined deviation of the frequency generator of the node and transmitting a data packet to the node at the base station transmission frequency; and tuning the base station transmission frequency to a node receiving frequency based on the determined deviation of the frequency generator of the node, the node receiving frequency being derived from the frequency generator of the node.

According to still another embodiment, a method for bidirectional data transmission between a base station and a node may have the steps of: receiving a data packet transmitted by the node at a node transmission point in time, the node transmission point in time being derived from a timer of the node; determining the node transmission point in time based on the data packet received and determining a time deviation of the timer of the node based on a time deviation between the determined node transmission point in time and a set node transmission point in time associated to the node; transmitting a data packet to the node, the data packet having the determined time deviation of the timer of the node and a correction value derived therefrom; receiving a further data packet transmitted by the node at a further node transmission point in time, the further node transmission point in time being derived from the timer of the node; determining the further node transmission point in time based on the further data packet and determining a further time deviation of the timer of the node based on a further time deviation between the determined further node transmission point in time and a further set node transmission point in time associated to the node; determining a clock deviation of the timer of the node based on the time deviation and the further time deviation; and wherein transmitting the data packet to the node has transmitting the data packet at the determined time deviation of the timer of the node or having a correction value derived therefrom.

Another embodiment may have a computer program having program code for performing the above methods, when the program runs on a computer or microprocessor.

Embodiments of the present invention provide a base station including bidirectional data transmission to a node. The base station comprises means for receiving a data packet transmitted by the node at a node transmission frequency, the node transmission frequency being derived from a frequency generator of the node. In addition, the base station comprises means for determining the node transmission frequency based on the data packet received and for determining a deviation of the frequency generator of the node based on a frequency deviation between the determined node transmission frequency and a set or desired node transmission frequency associated to the node. Furthermore, the base station comprises means for transmitting a data packet to the node at a base station transmission frequency, the means for transmitting the data packet being configured to set the base station transmission frequency based on the determined deviation of the frequency generator of the node.

In embodiments, the deviation of the frequency generator of the node from the base station is determined based on the frequency deviation between the determined node transmission frequency and the set node transmission frequency associated to the node, and the base station transmission frequency is set based on the determined deviation of the frequency generator of the node, exemplarily such that the base station transmission frequency is adjusted to a node receiving frequency which is also derived from the frequency generator of the node.

Further embodiments of the present invention provide a base station including bidirectional data transmission to a node. The base station comprises means for receiving a data packet sent by the node at a node transmission frequency, the node transmission frequency being derived from a frequency generator of the node. Additionally, the base station comprises means for determining the node transmission frequency based on the data packet received and for determining a deviation of the frequency generator of the node based on a frequency deviation between the determined node transmission frequency and a set node transmission frequency associated to the node. Furthermore, the base station comprises means for transmitting a data packet to the node, the data packet comprising the determined deviation of the frequency generator of the node or a correction value derived therefrom.

In embodiments, the deviation of the frequency generator of the node from the base station is determined based on the frequency deviation between the determined node transmission frequency and the set node transmission frequency associated to the node, and the determined deviation of the frequency generator of the node or a correction value derived therefrom is transmitted to the node in the data packet.

Further embodiments of the present invention provide a base station including bidirectional data transmission to a node. The base station comprises means for receiving a data packet transmitted by the node at a node transmission point in time, the node transmission point in time being derived from a timer of the node. In addition, the base station comprises means for determining the node transmission point in time based on the data packet received and for determining a time deviation of the timer of the node based on a time deviation between the determined node transmission point in time and a set node transmission point in time associated to the node. Furthermore, the base station comprises means for transmitting a data packet to the node, the data packet comprising the determined time deviation of the timer of the node or a correction value derived therefrom.

In embodiments, the deviation of the timer of the node from the base station is determined based on the time deviation between the determined node transmission point in time and the set node transmission point in time associated to the node, and the determined deviation of the timer of the node or a correction value derived therefrom is transmitted to the node in the data packet.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
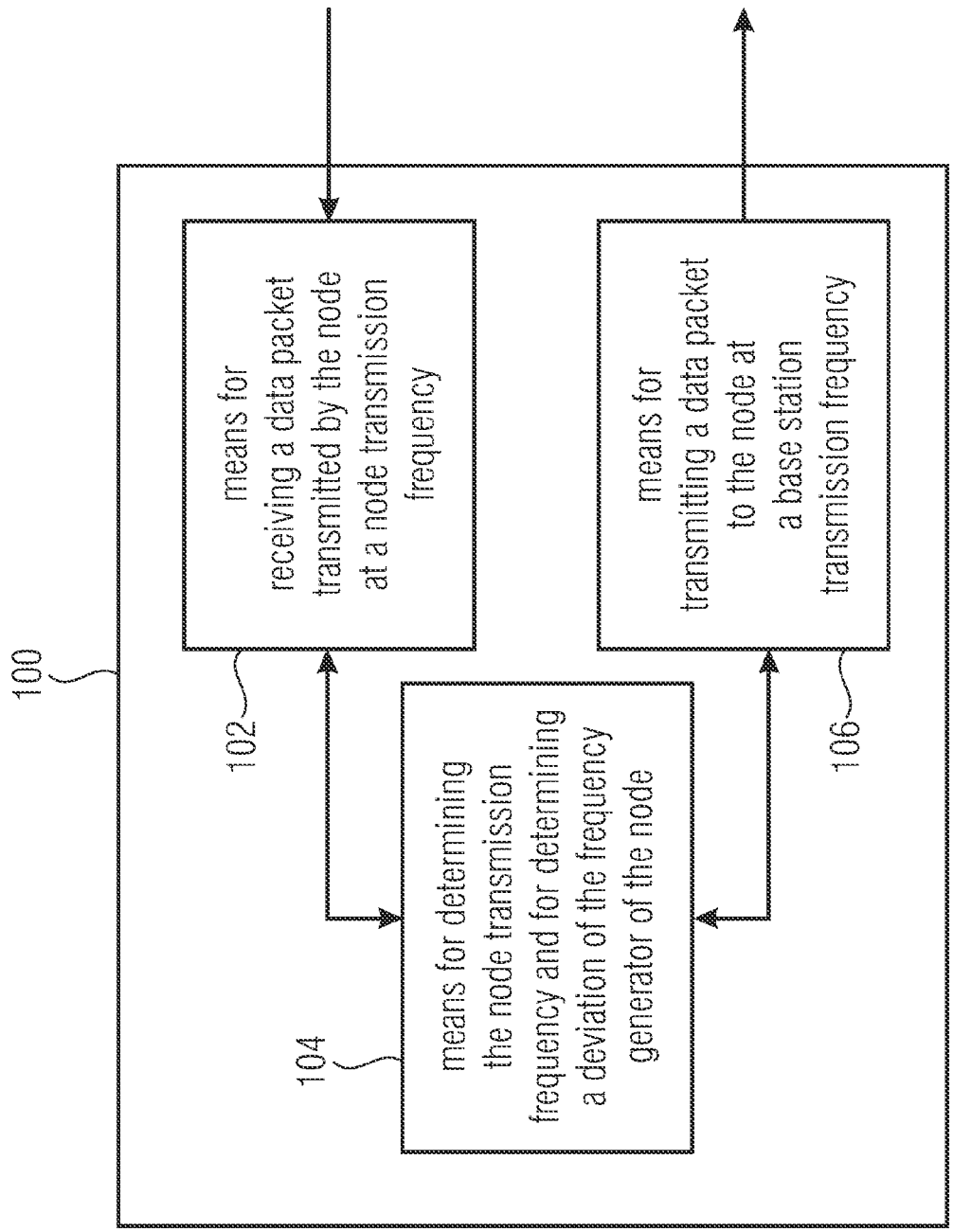
FIG. 1 is a block circuit diagram of a base station including bidirectional data transmission to a node in accordance with an embodiment of the present invention.

In the following description of embodiments of the invention, same elements or elements of equal effect in the figures are provided with the same reference numerals, meaning that the description thereof in the different embodiments is mutually exchangeable.

FIG. 1 shows a block circuit diagram of a base station 100 including bidirectional data transmission to a node in accordance with an embodiment of the present invention. The base station 100 comprises means 102 for receiving a data packet transmitted by the node at a node transmission frequency, the node transmission frequency being derived from a frequency generator of the node. In addition, the base station 100 comprises means 104 for determining the node transmission frequency based on the data packet received and for determining a deviation of the frequency generator of the node based on a frequency deviation between the determined node transmission frequency and a set node transmission frequency associated to the node. Additionally, the base station 100 comprises means 106 for transmitting a data packet to the node at a base station transmission frequency, the means 106 for transmitting the data packet being configured to set the base station transmission frequency based on the determined deviation of the frequency generator of the node.

In embodiments, the deviation of the frequency generator of the node from the base station 100 is determined based on the frequency deviation between the determined node transmission frequency and the set node transmission frequency associated to the node, and the base station transmission frequency is set based on the determined deviation of the frequency generator of the node. Because the base station 100 sets the base station transmission frequency based on the determined deviation of the frequency generator of the node, the data transmission from the base station 100 to the node 120 may be adjusted to the node receiving frequency which is derived from the frequency generator of the node and may also deviate correspondingly.

Exemplarily, the means 106 for transmitting the data packet to the node may be configured to tune the base station transmission frequency to the node receiving frequency based on the determined deviation of the frequency generator of the node.

Compared to the node 120 (see FIG. 2), usually there is more computing power and/or more complex hardware available in the base station 100, i.e. generally the receiver 102 is of higher performance. Additionally, cheap quartz or quartz crystal is usually used for the frequency generator of the node 120, which may exhibit a frequency deviation of more than 10 ppm. By estimating the frequency deviation of the node transmission frequency from the set node transmission frequency (transmission frequency offset) by the base station 100 and by applying this frequency deviation (transmission frequency offset) to the data transmission (sending) from the base station 100 to the node 120, the node 120 may be relieved and the complexity of processing be shifted to the base station 100.

The present invention allows the hardware of the node to be set up to be very simple and cheap since no expensive and complicated devices are required for generating a precise frequency or frequency-precise filters. Using standard elements/ICs (integrated circuits) at the node 120, a very high range may be achieved in the data transmission from the base station 100 to the node, since the base station 100 takes over frequency correction of the data transmission from the base station 100 to the node 120 (back channel), which is why the receiver 124 of the node 120 may exhibit a very narrow band and be very sensitive. This allows setting up the node 120 to be more energy-saving and thus allows, for example, increasing the battery lifetime in battery-operated nodes 120. The range of data transmission from the nodes 120 to the base station 100 may be increased by a receiver 102 more complicated in terms of hardware and calculating complexity. The present invention allows increasing the range of data transmission from the base station 100 to the node, since a more narrow-band receiving filter may be used in the node and the base station performs correction of the frequency deviation (frequency offset correction) when transmitting to the node 120. At the node 120, no frequency synchronization, or only one operating in a small range, to the data packets of the base station 100 is required.

Figure 2:
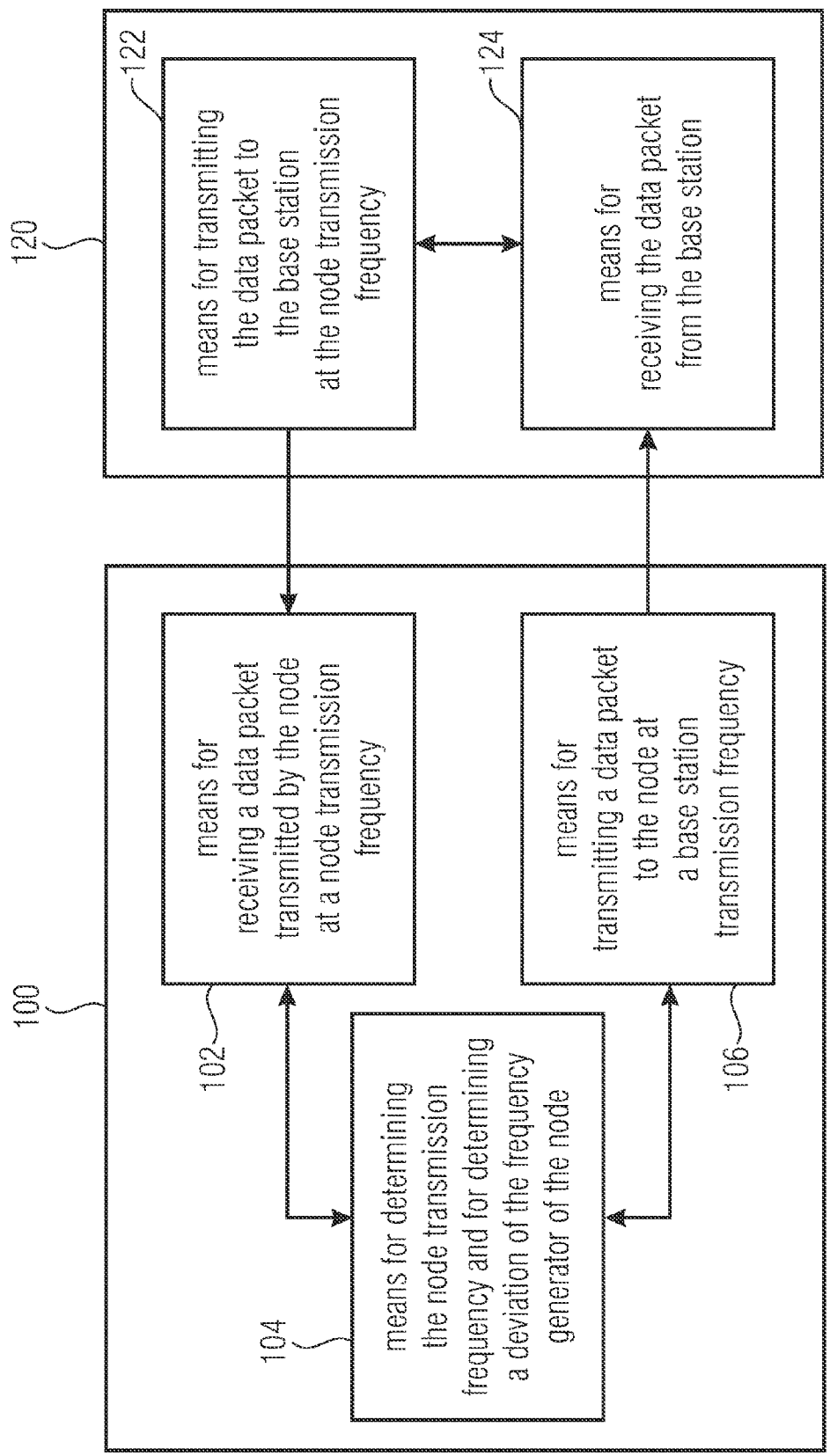
FIG. 2 is a block circuit diagram of a system for bidirectional data transmission in accordance with an embodiment of the present invention.

FIG. 2 shows a block circuit diagram of a system 110 for bidirectional data transmission in accordance with an embodiment of the invention. This system 110 comprises the node 120 and the base station 100 shown in FIG. 1. The node 120 comprises means 122 for transmitting the data packet to the base station 100 at the node transmission frequency, and means 124 for receiving the data packet from the base station 100, the means for receiving 124 the data packet from the base station 100 comprising a receiving filter having a bandwidth of less than 5%, 1%, 0.5%, 0.1% or 0.01% of the carrier frequency.

In embodiments of the present invention, the node 120 may be a sensor or meter, such as, for example, temperature sensor, or heating, electricity or water meter. The node 120 may exemplarily comprise measuring means, the measuring data, such as, for example, a sensor value or count, being transmitted to the base station 100 wirelessly. The system 100 is bidirectional, i.e. the system 110 comprises a to-channel and a from- or back-channel. Additionally, uncoordinated and coordinated operations are differentiated between. Compared to the node 120, a higher computing power and more expensive hardware including digital signal processing may be available in the base station 100. Thus, the receiving sensitivity of the base station 100 is generally higher than that of the node 120. Conventionally, however, both (base station 100 and node 120) are limited in their maximum transmission power by regulation.

Figure 3:
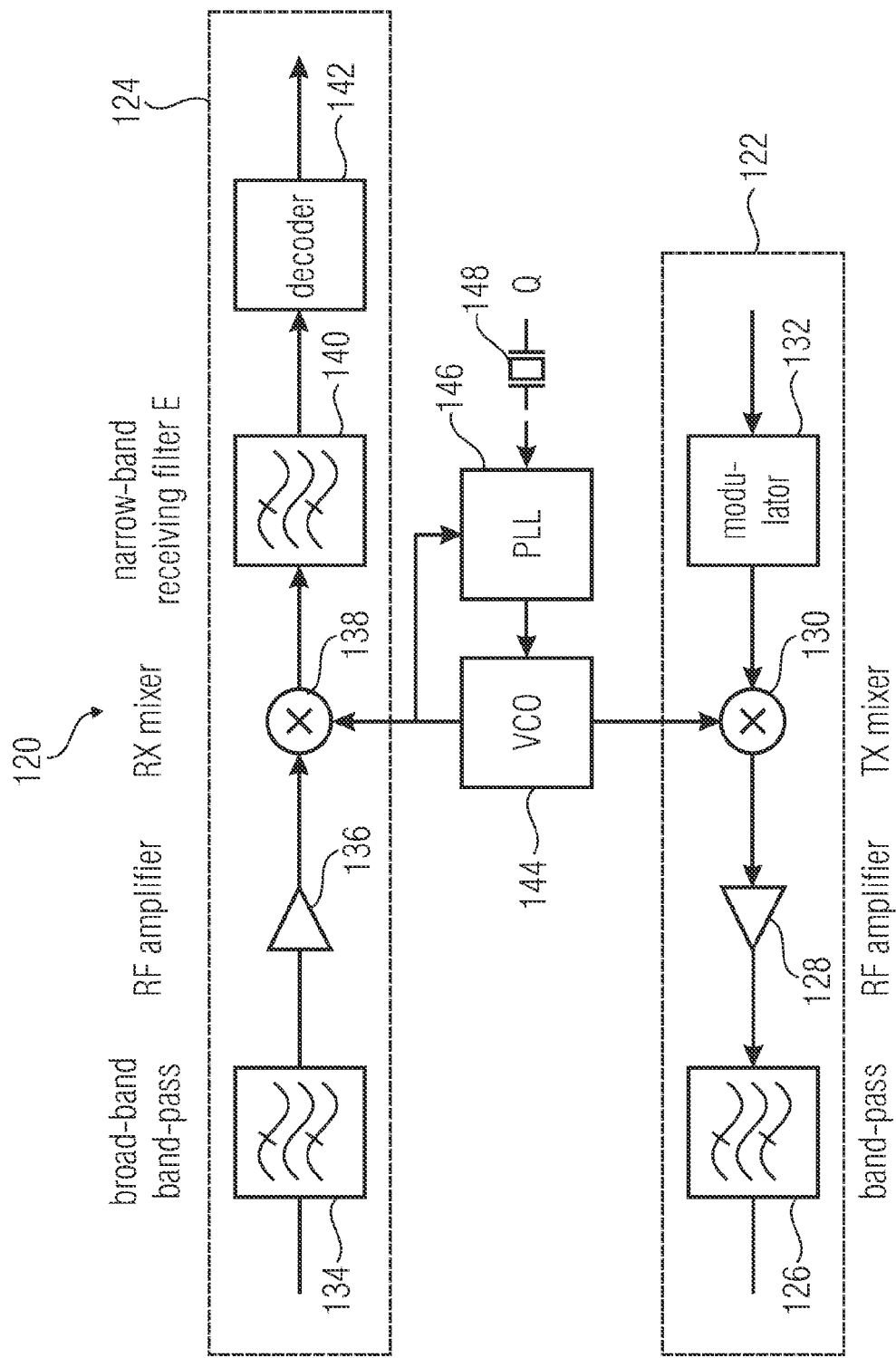
FIG. 3 is a block circuit diagram of a conventional node.

FIG. 3 shows a block circuit diagram of a conventional node 120. The means 122 for transmitting the data packet comprises a band-pass filter 126, an RF (radio frequency) amplifier 128, a transmission mixer 130 (RX mixer) and a modulator 132. The means 124 for receiving the data packets comprises a broad-band bandpass filter 134, an RF amplifier 136, a receiving mixer 138 (RX mixer), a narrow-band receiving filter 140 and a decoder 142. Additionally, the node 120 comprises a VCO (voltage controlled oscillator), a PLL (phase lock loop) 146 and a frequency generator 148, the frequency generator 148 usually being a quartz Q. The VCO 144 provides the frequency for the RX mixer 138 and the TX mixer 130.

Thus, a concept is needed, by means of which the sensitivity of the receiver 124 in the node 120 may be increased. One way is using a narrow-band modulation for the data transmission from the base station 100 to the node 120. Thus, the receiving filter E (140) may be made to be more narrow-banded. This means that less noise is introduced into the decoder 142, the SNR (signal-to-noise ratio) applying at the decoder 142 increasing. Thus, the receiver 124 of the node 120 becomes more sensitive. However, it is not easily possible to select the receiving filter E (41) to be very narrow. Caused, for example, by aging, temperature drift and manufacturing tolerances, the quartz Q exhibits a quartz offset $Q_o$. This is usually measured in PPM (parts per million). In cheap quartzes (usually cheap quartzes are necessitated in order to keep the price of the nodes 120 low), this is in the range of $Q_o$=20 PPM. At an operating frequency of the system of F=800 MHz, there may be a variation in the node receiving frequency in the range of d=800 MHz times 20 PPM=16 KHz. The receiving filter E (140) conventionally has to be broader by a multiple of the possible variation of the node receiving frequency in order to be able to securely receive a data packet (signal).

In a system 110 comprising the base station 100 and a plurality of nodes 120, each node 120 at first transmits data packets (application data packets) in the frequency range U (for uncoordinated transmission) in uncoordinated operation at a pseudo-random point in time. The base station 100 receives this data packet (application data packet) and determines the node transmission frequency Sf and determines from this the quartz offset of the quartz Q of the node 120.

Typically, the mixer frequency of the receiving branch 124 is derived from the same quartz Q as is the mixer frequency of the transmission branch 122. Thus, the base station 100 is able to determine the node receiving frequency Ef. In the easiest case, the node transmission frequency here equals the node receiving frequency (Ef=Sf). Then, the base station 100 transmits data packets (coordination data packets) back, as precisely as possible, at the frequency Ef, i.e. the base station 100 tunes the base station transmission frequency to the node receiving frequency. Since the precise node receiving frequency is known, the receiving filter E (140) of the node 120 may be selected to be of a very narrow band.

Another advantage is that this means that no or only a simple synchronization of the receiver 124 to the base station transmission frequency has to take place in the decoder 142, since the base station 100 transmits back at the node receiving frequency as precisely as possible.

Figure 4:
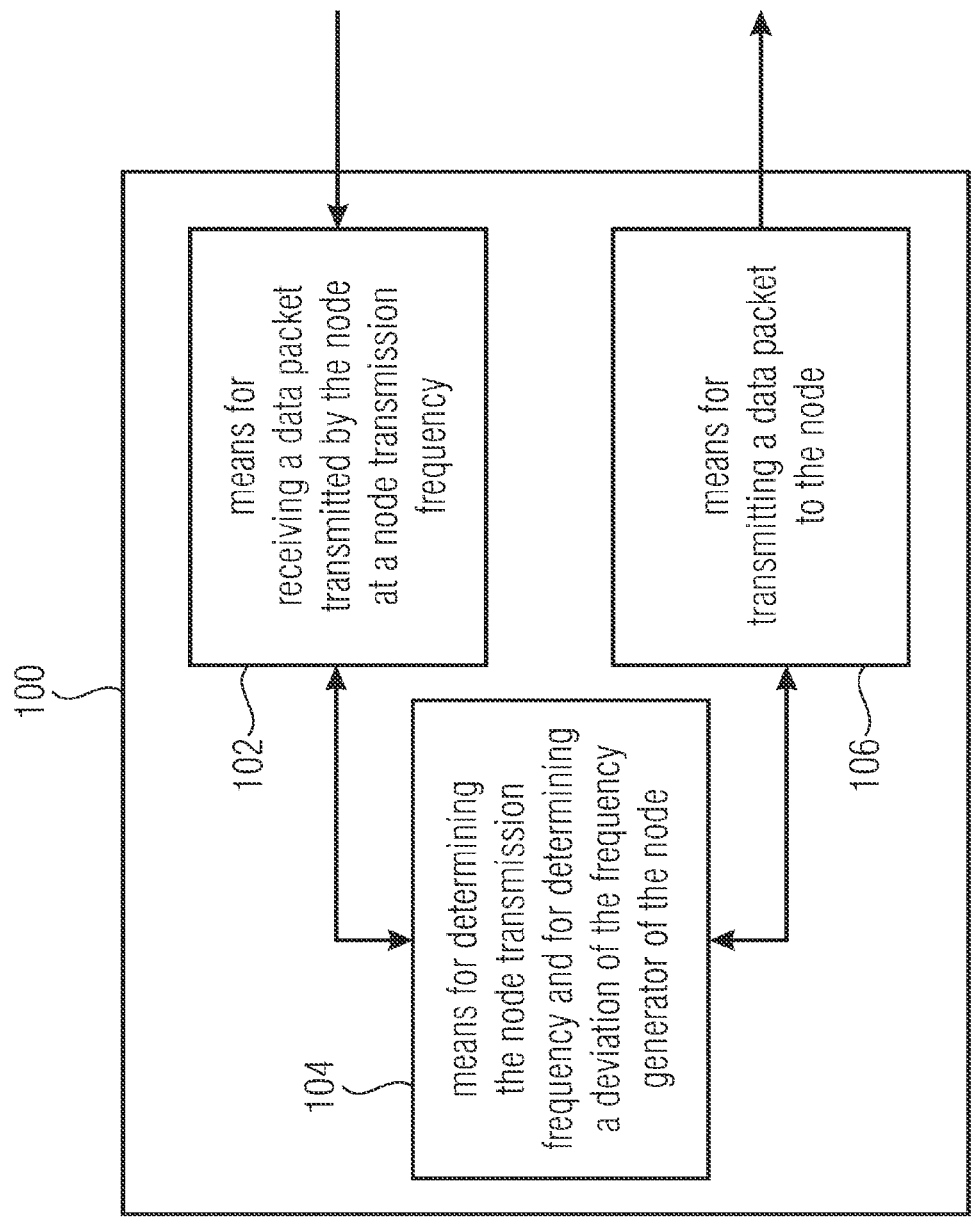
FIG. 4 is a block diagram of a base station including bidirectional data transmission to a node in accordance with another embodiment of the present invention.

FIG. 4 shows a block diagram of a base station 100 including bidirectional data transmission to a node 120 in accordance with another embodiment of the present invention. The base station 100 comprises means 102 for receiving a data packet transmitted by the node at a node transmission frequency, the node transmission frequency being derived from a frequency generator of the node 120. Additionally, the base station 100 comprises means 104 for determining the node transmission frequency based on the data packet received and for determining a deviation of the frequency generator of the node 120 based on a frequency deviation between the determined node transmission frequency and a set node transmission frequency associated to the node 120. Furthermore, the base station 100 comprises means 106 for transmitting a data packet to the node 120, the data packet exhibiting the determined deviation of the frequency generator of the node 120 or a correction value derived therefrom.

In embodiments, the deviation of the frequency generator of the node 120 from the base station 100 is determined based on the frequency deviation between the determined node transmission frequency and the set node transmission frequency associated to the node, and the determined deviation of the frequency generator of the node or a correction value derived therefrom is transmitted to the node 120 in the data packet. In other words, by estimating the frequency deviation of the node transmission frequency from the set node transmission frequency (transmission frequency offset) by the base station 100 and by transmitting the frequency deviation or a correction value derived therefrom to the node 120, the node 120 may be relieved and the complexity in processing be shifted to the base station 100.

Compared to the base station 100 shown in FIG. 1, it is not the base station transmission frequency which is set based on the determined deviation of the frequency generator of the node 120, but the determined deviation of the frequency generator of the node 120 or a correction value derived therefrom is transmitted to the node 120 in the data packet.

The present invention allows the nodes 120 to transmit in a very tight frequency pattern, without disturbing one another in the channels by transmitting at different frequency deviations (frequency offset). Even a deviation of the absolute frequency of the base station 100 is insignificant, since all the nodes 120 are corrected by the base station 100 to their set node transmission frequency (target frequency), and thus the relative channel pattern of the nodes 120 relative to one another is fixed. This tight channel pattern allows many nodes 120 to transmit simultaneously, without disturbing one another, thereby increasing the data transmission rate. Additionally, the nodes 110 are able to transmit very far towards the band edge. This increases the transmission bandwidth available and the data transmission rate may be increased. Without any correction by the base station 100, the nodes 120 would have to keep a greater or further distance to the band edge, due to the frequency deviation (transmission frequency offset).

Figure 5:
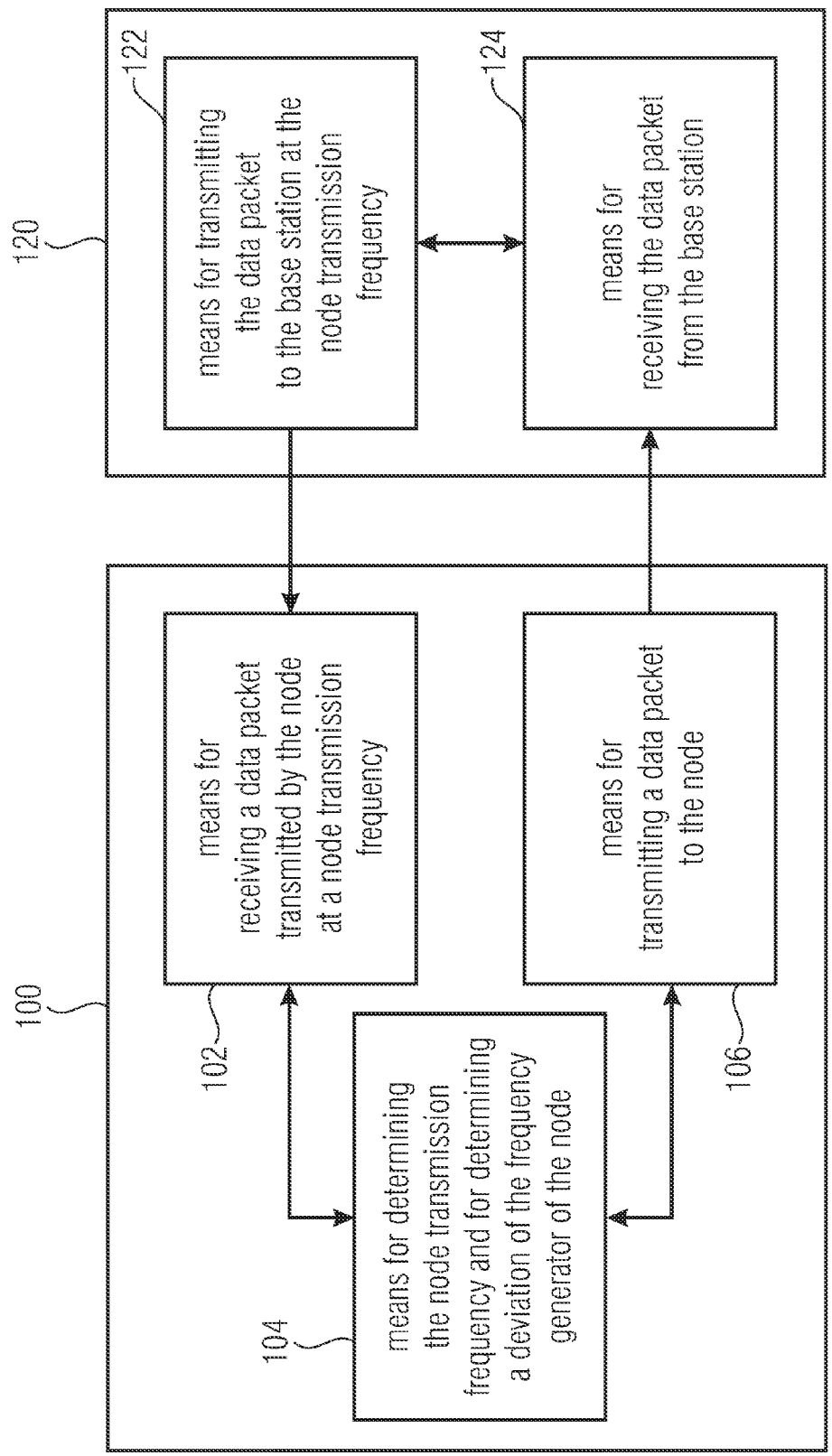
FIG. 5 is a block circuit diagram of a system including bidirectional data transmission in accordance with another embodiment of the present invention.

FIG. 5 shows a block circuit diagram of a system 110 including bidirectional data transmission in accordance with an embodiment of the present invention. This system 110 comprises the node 120 and the base station 100 shown in FIG. 4. The node 120 comprises means 122 for transmitting the data packet to the base station 100 at the node transmission frequency, and means 124 for receiving the data packet from the base station 100. The means 122 for transmitting the data packet to the base station 100 is configured to set the node transmission frequency to the set node transmission frequency based on the determined deviation of the frequency generator, or the correction value derived therefrom.

Subsequently, an embodiment of the present invention will be described, in which the inventive base station 100 is used in an FDMA (frequency division multiple access) system 110 comprising a plurality of nodes 120, wherein at first the basics of FDMA will be discussed.

Figure 6:
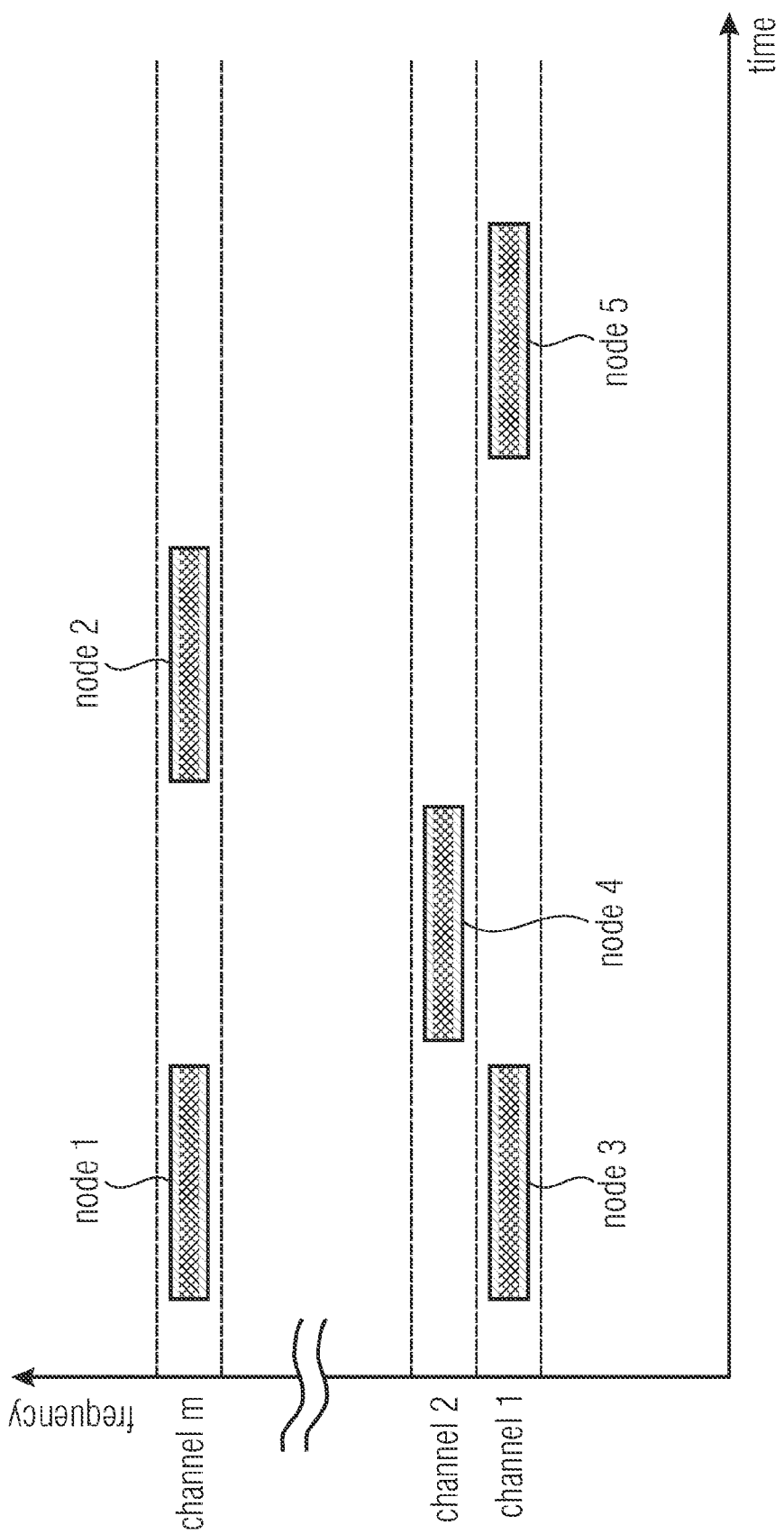
FIG. 6 is a diagram of the utilization of a communications channel of an FDMA system over time, the ordinate plotting the frequency and the abscissa plotting the time.

FIG. 6 shows a diagram of the utilization of a communications channel of an FDMA system over time, the ordinate describing the frequency and the abscissa describing the time. In an FDMA system, participants (base station 100 and nodes 120) communicate at different frequencies or channels, wherein a channel comprises a frequency (mean frequency) and a defined bandwidth. This means that several participants are able to simultaneously transmit data packets without disturbing one another. Exemplarily, at a point in time T1, a first node 120 transmits in the channel M and a third node in the channel 1, at a point in time T2, a fourth node transmits in the channel 2, at a point in time T3, a second node transmits in the channel M and at a point in time D4, a fifth node transmits in the channel 1. In FIG. 6, the first node and the second node share channel M, so that FIG. 6 represents an FDMA system with additional TDMA (time division multiple access).

Figure 7:
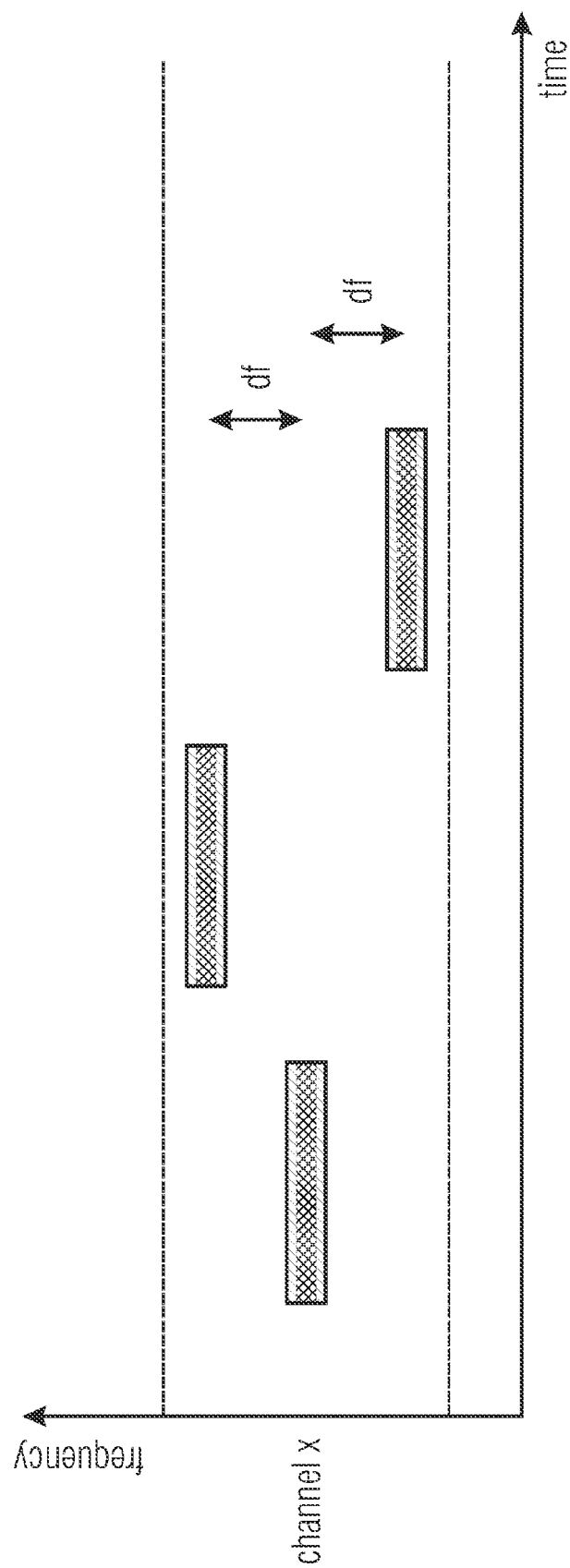
FIG. 7 is a diagram of a frequency deviation of a node transmission frequency from the mean frequency of a channel, the ordinate plotting the frequency and the abscissa plotting the time.

FIG. 7 shows a diagram of a frequency deviation of a node transmission frequency from the mean frequency of a channel x, the ordinate describing the frequency and the abscissa describing the time. If the node transmission frequency varies, caused by the quartz offset Q of the nodes, around the mean frequency fk of the channel x in the range +/−df, the channel bandwidth has to be selected to be greater by the factor 2 df compared to nodes 120, the quartz offset of which is corrected.

The frequency deviation of the node transmission frequency (frequency offset) is corrected by transmitting the correction information from the base station 100 which determines the node transmission frequency of the respective nodes 120 to the respective nodes 120. This allows reducing the range df and thus increasing the number of channels of the FDMA system using the inventive base station 100.

Figure 8:
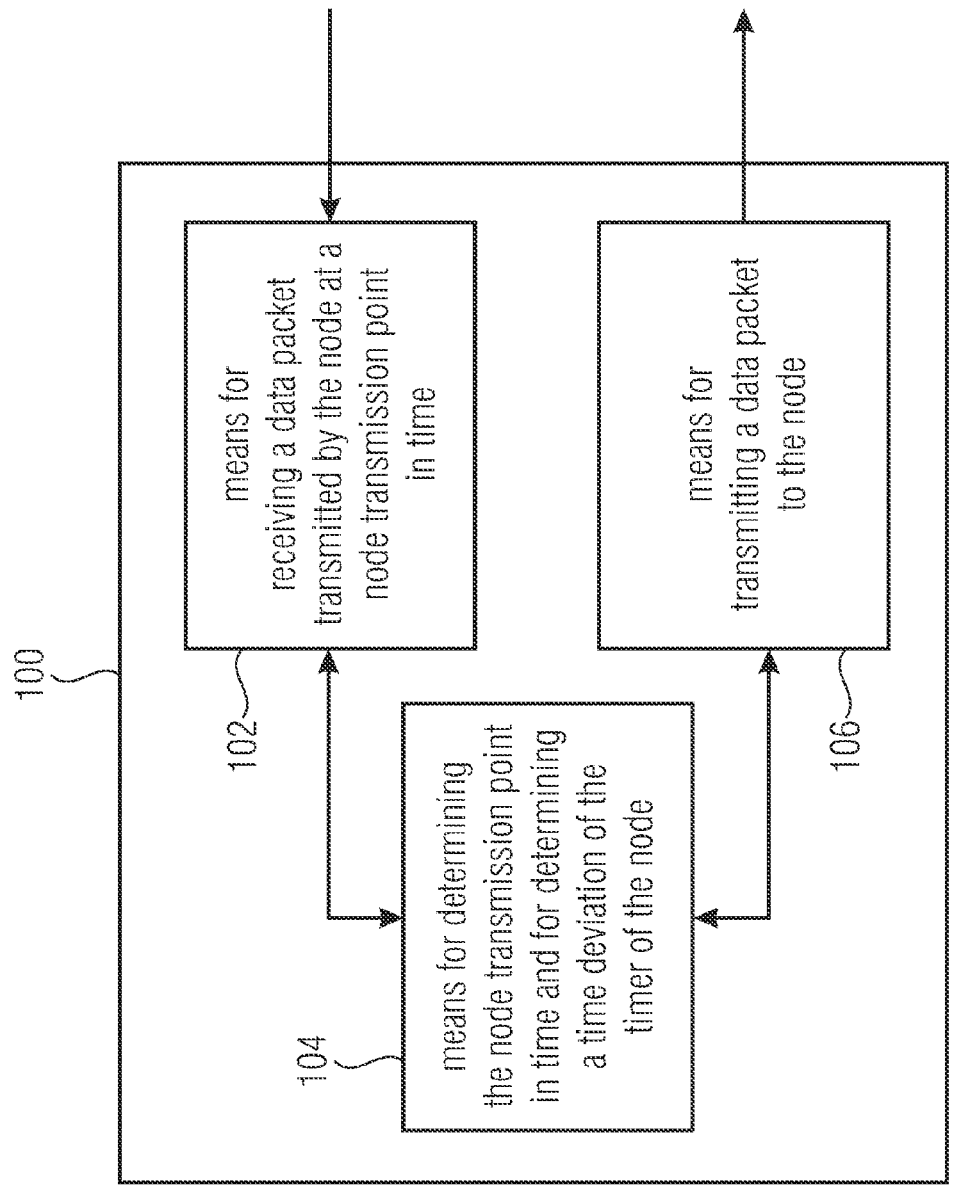
FIG. 8 is a block diagram of a base station including bidirectional data transmission to a node in accordance with another embodiment of the present invention.

FIG. 8 shows a block diagram of a base station 100 including bidirectional data transmission to a node 120 in accordance with another embodiment of the present invention. The base station 100 comprises means 102 for receiving a data packet transmitted by the node 120 at a node transmission point in time, the node transmission point in time being derived from a timer of the node 120. Additionally, the base station 100 comprises means 104 for determining the node transmission point in time based on the data packet received, and for determining a time deviation of the timer of the node based on a time deviation between the determined node transmission point in time and a set node transmission point in time associated to the node. Furthermore, the base station 100 comprises means 106 for transmitting a data packet to the node 120, the data packet exhibiting the determined time deviation of the node 120 or a correction value derived therefrom.

In embodiments, the deviation of the timer or time base of the node 120 from the base station 100 is determined based on the time deviation between the determined node transmission point in time and a set node transmission point in time associated to the node 120, and the determined time deviation of the timer of the node 120 or a correction value derived therefrom is transmitted to the node 120 in the data packet.

Compared to the base station 100 shown in FIGS. 1 and 5 configured to determine the frequency deviation of the frequency generator of the node 120 based on the frequency deviation between the determined node transmission frequency and the set node transmission frequency associated to the node 120, the base station 100 shown in FIG. 8 is configured to determine the time deviation of the timer of the node 120 based on the time deviation between the determined node transmission point in time and the set node transmission point in time associated to the node 120. In embodiments, the inventive base station 100 may additionally be configured to determine the frequency deviation of the frequency generator of the node 120 and the time deviation of the timer of the node 120.

The means 102 for receiving the data packet transmitted by the node 120 at the node transmission point in time may be configured to receive a further data packet transmitted by the node 120 at a further node transmission point in time, the further node transmission point in time being derived from the timer of the node 120. The means 104 for determining the node transmission point in time may be configured to determine the further node transmission point in time based on the further data packet, the means 104 for determining the time deviation of the timer of the node 120 being configured to determine a further time deviation between the determined further node transmission point in time and a further set node transmission point in time associated to the node 120 and to determine a clock deviation of the timer of the node 120 based on the time deviation and the further time deviation. The means 106 for transmitting the data packet to the node 120 may be configured to transmit the data packet to the node 120 with the determined clock deviation of the timer or comprising a correction value derived therefrom.

By estimating the time deviation (offset of the time base, i.e. by how much the clock is wrong) and the clock deviation of the timer (frequency offset of the time base, i.e. by how much the clock is fast or slow) of the node 120 by the base station 100 and by transmitting these deviations or the correction values derived therefrom to the node 120, the node 120 can be relieved further and the complexity of processing be shifted to the base station.

In embodiments, the means 106 for transmitting the data packet to the node 120 may be configured to transmit the data packet to the node 120 for synchronization of a node receiving point in time with a base station transmission point in time or comprising a value derived therefrom.

Exemplarily, the nodes 120 are able to transmit in a certain time pattern for a very long time and very precisely, even without continuously updating their time (thereby saving power consumption of the nodes 120, since the receiver 124 has to be switched on less frequently). This enables shorter security intervals between the emission of data packets, whereby the data transmission rate can be increased. The time necessitated when the receiver 124 has to be switched on in order to receive information from the base station 100 is reduced, since the point in time of switching on can be determined more precisely. Less computing capacity is necessitated at the node 120, since complex processes for synchronization to the base station 100 do not have to be used. Thus, the design of the node 120 can be highly power-saving, since data packets or data symbols can be transmitted at defined points in time without any synchronization information. Furthermore, transmission time/transmission power can be saved at the base station 100, as synchronization sequences are not necessary. Furthermore, the data transmission from the base station 100 to the nodes 120 provides increased transmission security due to the distribution of the data packets (data symbols) to different frequencies or channels and/or the use of an error protection procedure. Furthermore, the synchronization sequence from the node 120 to the base station 100 can be reduced, which saves transmission time/transmission power at the node 120. Thus, it is possible to design the node 120 to save more energy and thus increase the lifetime of the battery, for example in battery-driven nodes 120.

In contrast to GSM (global system for mobile communications) making use of an estimation for synchronization in the TDMA scheme, in the present invention, the precision of the time estimation relative to the symbol duration is estimated precisely and compensated in order for temporal synchronization in the receiver 124 to be simplified or be dispensed with. Additionally, the present invention, in contrast to GSM, which is connection-oriented, focuses on packet-oriented protocols.

Figure 9:
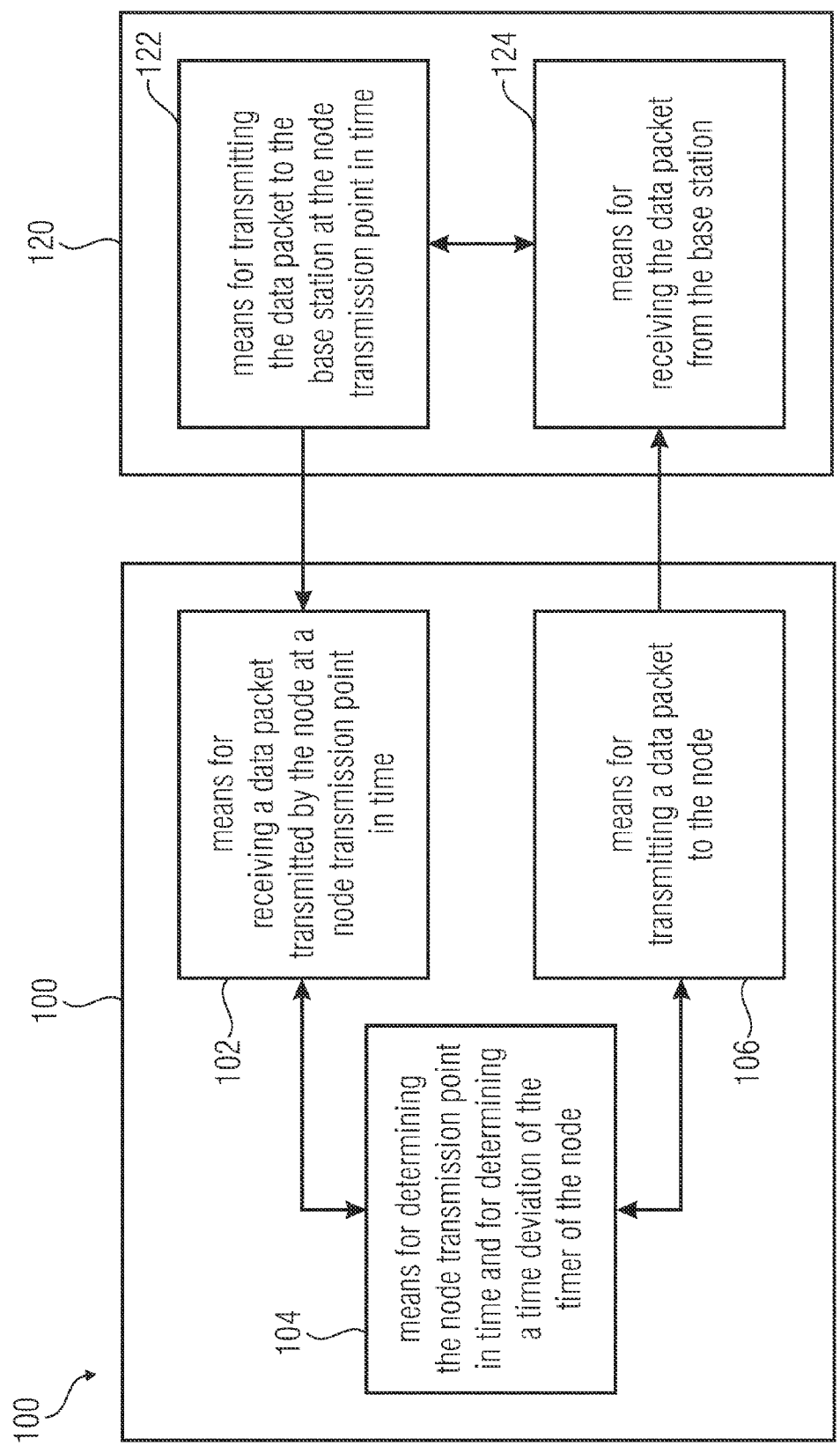
FIG. 9 is a block circuit diagram of a system including bidirectional data transmission in accordance with another embodiment of the present invention.

FIG. 9 shows a block circuit diagram of a system 110 including bidirectional data transmission in accordance with an embodiment of the present invention. The system 110 comprises the node 120 and the base station 100 shown in FIG. 9. The node 120 comprises means 122 for transmitting the data packet to the base station 100 at the node transmission point in time, and means 124 for receiving the data packet from the base station, the means 122 for transmitting the data packet being configured to set the node transmission point in time to the set node transmission point in time based on the determined deviation of the timer or the correction value derived therefrom.

An embodiment of the present invention will be described below, in which the inventive base station 100 is used in a TDMA (time division multiple access) system 110 comprising a plurality of nodes 120, wherein at first the basics of TDMA will be discussed.

Figure 10:
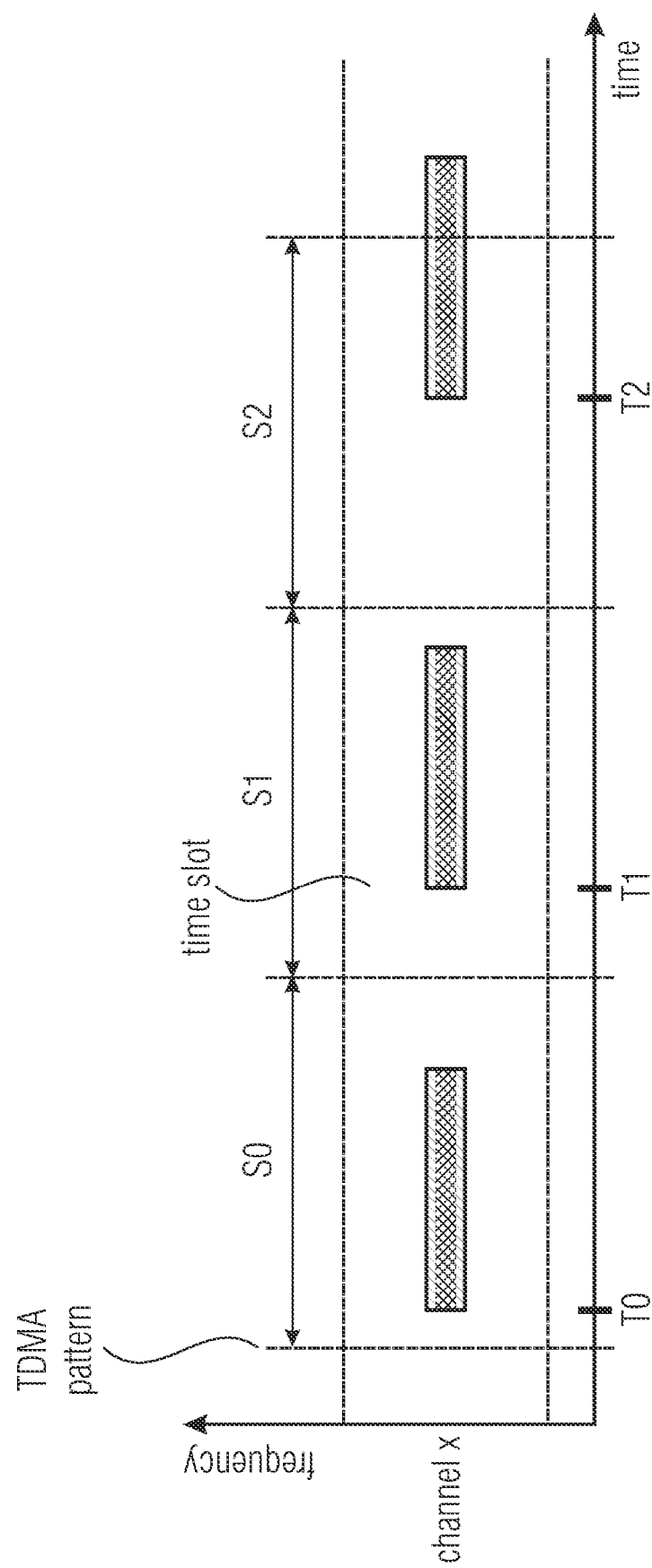
FIG. 10 is a diagram of the utilization of a communications channel of a TDMA system over time, the ordinate plotting the frequency and the abscissa plotting the time.

FIG. 10 shows a diagram of the utilization of a communications channel of a TDMA system over time, the ordinate describing the frequency and the abscissa describing the time. In a TDMA system, the base station 110 and the plurality of nodes 120 share a frequency channel (channel x), wherein the base station 110 and the plurality of nodes 120 transmit at different points in time, exemplarily at the points in time T0, T1 and T2. The TDMA pattern may be subdivided into equal, different or variable time slots, exemplarily time slots S0, S1 and S2. A node 120 may be transmitted either randomly in a time slot (slotted ALOHA) or in an allocated time slot wherein the node transmission point in time is derived from a timer (time base) of the node 120. The node transmission point in time T0, T1 or T2 thus should, as regards time, be within a time slot S0, S1 or S2 such that the data packet is transmitted from the node 120 to the base station 100 within the time slot S0, S1 or S2.

Due to a deviation (time deviation and/or clock deviation) of the timer of the node 120, a deviation or variation of the node transmission point in time T0, T1 or T2 may arise, as is shown in FIG. 10. Additionally, a transmission error may arise when the variation of the node transmission point in time T2 is so large that the data packet can no longer be transmitted within the time slot S2.

In order to reduce the deviation or variation of the node transmission point in time, the base station 100 may determine the time deviation of the timer of the node 100. Here, the node transmission point in time (i.e. the point in time when the node has transmitted its uncoordinated packet) is measured or determined by the base station 100. The base station 100 transmits to the node 120 the determined time deviation of the timer of the node 120 or a correction value derived therefrom, such as, for example, a time difference relative to the node transmission point in time at which the node 120 is to transmit (this may be thought of as transmitting a time of day. Thus, the node 120 can determine the set node transmission point in time T0 and transmit same in the TDMA pattern. In addition, the base station 100 may also report the channel to the node 120. This means that the node 120 knows both the TDMA time slot and the FDMA frequency. Transmissions in the TDMA pattern and on the allocated channel are referred to as coordinated transmissions of the node 120.

In order to reduce the deviation or variation of further node transmission points in time, the base station 100 may determine a clock deviation of the timer of the node 120. Conventionally, a 32 KHz quartz watch crystal exhibiting a clock deviation (offset) is used in the nodes 120 as the timer (time base). On the one hand, the base station 100 can transmit correction values for the further node transmission points in time. In order for the base station 100 to have to transmit these correction values only rarely, the base station 100 may determine the clock deviation of the quartz of the timer of the node 120. The base station 100 may determine this clock deviation (by how much is the clock fast or slow) by evaluating the measurement of the data packets arriving from the node 120. If the base station 100 commands the node 120 to transmit a data packet at the set node transmission point in time T0 and another data packet at the further set node transmission point in time T1, and if the base station 100 receives the data packet at the node transmission point in time Ts0 and the further data packet at the further node transmission point in time Ts1, the clock deviation of the quartz of the timer of the node 120 may be estimated to be $((Ts1-Ts0)-(T1-T0))/(T1-T0)$. By averaging the evaluation of the reception of several data packets from the node 120, the precision of the estimation of the clock deviation may be improved. When the node 120 corrects the clock deviation, it is able to transmit in the TDMA pattern longer without any correction information relating to the TDMA pattern having to be transmitted from the base station 100 to the node 120. In efficient transmission methods, the node 120 will usually additionally transmit, with each transmission to the base station 100, a synchronization sequence in order for the base station 100 to be able to detect the data packet. In coordinated operation, the synchronization sequence may become smaller or shorter, since the base station 100 already knows the approximate node transmission point in time (i.e. the point in time when transmission of the node 120 takes place). The node transmission point in time can be determined more precisely by correcting the clock deviation. This allows further limiting the length of the synchronization sequence or totally dispensing with the synchronization sequence. The base station 100 is able to determine whether the node 120 may dispense with emitting the synchronization frequency, exemplarily by evaluating how much the node transmission points in time (reception points in time Ts) deviates from the set node transmission points in time (commanded transmission points in time T).

In coordinated operation of the TDMA system 110, there may be fixed defined base station transmission points in time when the base station 100 transmits data packets (information) to the nodes 120. In order to make the means 124 for receiving data packets (receiver 124) of the node 120 as simple as possible, if the time of modulation for transmissions from the base station 100 to the node 120 is selected to be suitable, special synchronization of the node 120 to the emission from the base station 100 may be dispensed with, i.e. the base station 100 does not have to emit synchronization sequences when transmitting to the nodes 120. A possible modulation here is, for example, OOK (on-off keying). The node 120 exemplarily detects at certain base station transmission points in time known to the node 120 and the base station 100 whether the base station 100 emits a signal or not. Using the method described above, the base station transmission point in time from the base station 100 may be made known to the node 120.

In a system of several participants in which simple, battery-operated nodes 120 transmit data packets to a more sensitive and more complex base station 100 cyclically, with a large number of nodes 120 which operate in accordance with a random channel access method, such as, for example, ALOHA and slotted ALOHA, collisions of data packets of different nodes 120 may arise and, consequently, data losses. If a back channel from the base station 100 to the nodes 120 is provided for in such systems, the node transmission point in time (transmission point in time of the node) may be coordinated by the base station 100. One way is, for example, for the node 120 to only respond after being requested by the base station 100. Here, the node 120 would have to continuously monitor the radio channel or communications channel, resulting in a higher power consumption.

Even when the base station 100 coordinates the node 120, the frequency band used may be a generally usable radio band in which there are other systems which cannot be coordinated by the inventive base station 100. The consequence is that there are still collisions in these systems. Embodiments of the present invention allow coordination of the nodes 120 such that the result is the least possible self-interference (transmission frequency and transmission time coordination) and the least possible external interference (utilization of band edges and band gaps and narrow-band transmission).

Due to the differing performance of the nodes 120 and the base station 100, it is necessitated to further relieve the simple nodes 120 and shift the complexity of processing to the base station 100. The central element is an exact estimation of the frequency generator (node reference frequency) and timer (node time base) of the node 120. There may also be solutions in which the reference frequency and the time base are mutually dependent.

A method for coordinating the nodes 120 (coordination method) which can be performed by the inventive base station 100 will be described below. In the coordination method, the nodes 120 at first transmit in an uncoordinated manner, then correction values are determined by the base station 100, exemplarily as described in the embodiments of the base station 100 mentioned above (such as, e.g., in FIGS. 1, 5 and 8) and the nodes 120 are subjected to coordination. Coordination here refers to the nodes 120 transmitting either randomly in defined time slots (slotted Aloha) or in defined time slots in randomly selected defined channels or frequency channels or in defined frequency channels.

The coordination method thus allows a higher data throughput and a more secure data transmission (such as, e.g., defined latency) and less data packets necessitated compared to the ALOHA protocol, since there are fewer collisions (with slotted Aloha) or even no collisions at all. No (complicated) determination and processing of correction values/times are necessitated in the node 120 in order to keep to the time slots, since the information are determined by the base station 100 for the respective node 120 and are regularly transmitted to same in a coordinated state (when necessitated, i.e. when deviations arise). This allows setting up the node 120 to be more energy-saving and, consequently increasing the battery lifetime, exemplarily in the case of battery-operated nodes 120.

Figure 11:
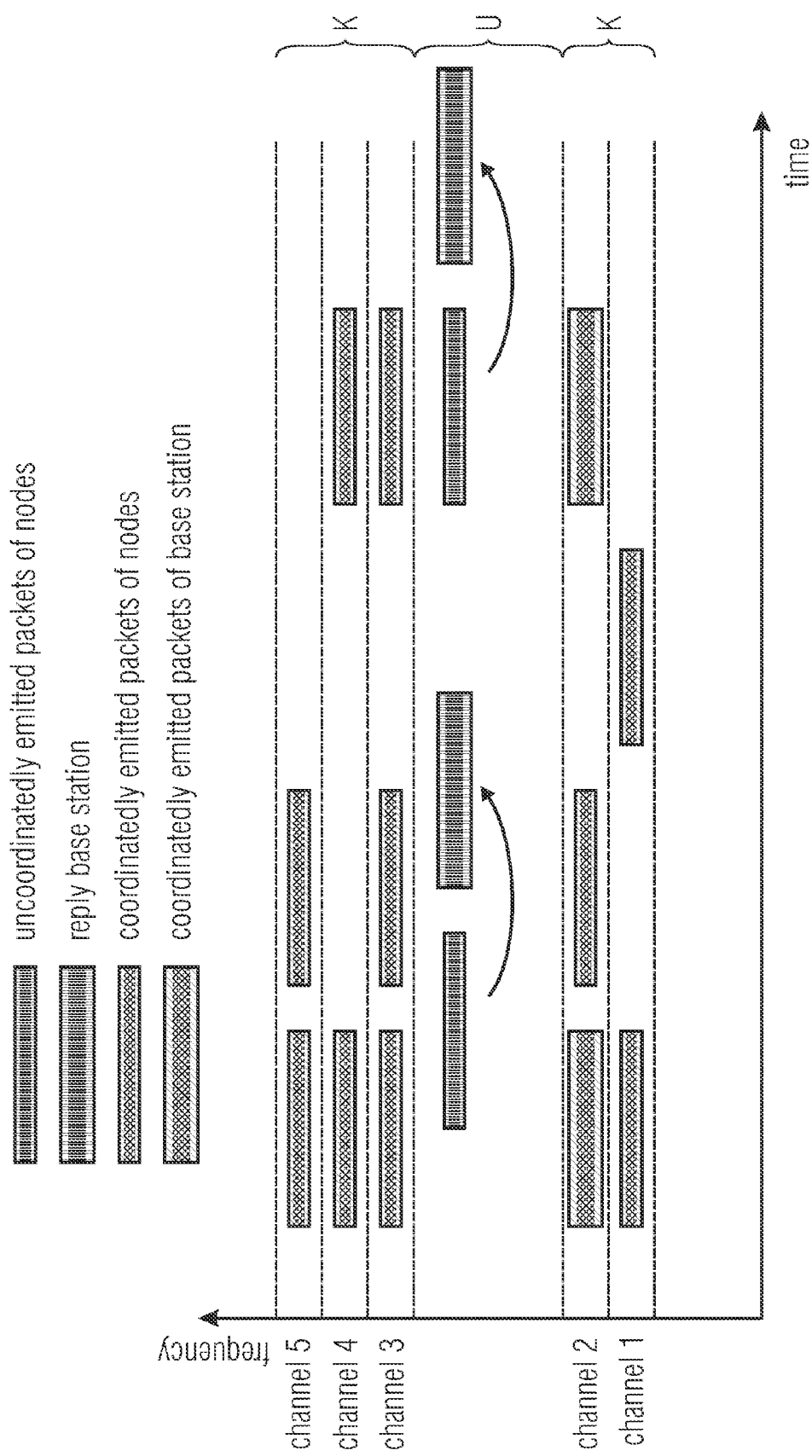
FIG. 11 is a diagram of the utilization of a communications channel in the coordination method in accordance with an embodiment of the present invention, the ordinate describing the frequency and the abscissa describing the time.

FIG. 11 shows a diagram of the utilization of a communications channel in the coordination method in accordance with an embodiment of the present invention, the ordinate describing the frequency and the abscissa describing the time. At the beginning, the nodes 120 transmit in an uncoordinated manner in the uncoordinated frequency range U. U may be separate from the coordinated frequency range K, but may also be overlapping. The case with no overlapping results in less disturbances in the coordinated operation. U is broader than channels in the coordinated frequency range K, since the frequency of the nodes 120 may deviate even more strongly, since no correction of the node transmission frequency has been performed so far by the base station 100.

The base station 100 may receive or occasionally receive in the frequency range U. If the base station 100 receives a data packet of a node 120 there, it may respond to said node 120, exemplarily as is described in the embodiments of FIGS. 4 and/or 8, and coordinate the node 120 (i.e., for example, transmission of frequency/time/quartz offset information). From then on, the node 120 transmits in a coordinated manner in the frequency range K.

Thus, it is possible to also coordinate systems in which the emissions of many nodes 120 overlap in the region U. In case of overlapping, the base station 100 will at first find the nodes 120 received at high power. When these nodes 120 arriving at the base station 100 at high power are coordinated, they no longer overlap the weakly received nodes 120 in the region U. For secure transmission of the reply of the base station 100 to the nodes 120, the base station 100, in the uncoordinated case, may also transmit back in a narrow band in a coordinated channel or at the edge of the uncoordinated channel in order to reduce collisions with existing nodes 120 which cannot be coordinated.

In case a node 120 has not received any correction data from the base station 100 over a longer time, the node 120 may switch back to uncoordinated operation. The base station 100 may determine whether it has successfully commanded the node 120 to the coordinated operation by monitoring whether it has received the node 120 in the allocated channels/time slots.

Additionally, sensor data may also be transmitted from the node 120 to the base station 100 in uncoordinated operation, exemplarily in case the base station 100 does not have the ability of coordinating nodes 120, thereby also making operation possible.

Certain time slots may be kept free by the base station 100 for communication from the base station 100 to the nodes 120 (i.e. there is no node 120 configured to transmit in this time slot). At best, this time slot is varied over the frequency in order to be able to avoid potential interferers. Information transmitted from the base station 100 to the node 120 may be divided into several data packets, potentially including error protection.

Additionally, there may be time slots where only certain nodes 120 or certain groups receive (exemplarily classified according to serial numbers). Thus, information may be transmitted efficiently to certain nodes 120 without many nodes 120 having to receive the data and, thus, necessitating current.

In known systems, the nodes will try to first receive a base station and synchronize thereto. In contrast to existing systems in which the nodes synchronize to the base station, in accordance with the concept of the present invention, the base station 100 performs synchronization of frequency and time of the nodes 120 for each of the participating nodes 120. Thus, the hardware and the computing power necessitated in the nodes 120 can be made more simple, and the range of the system 110 be increased. Using coordinated operation to which the base stations 100 may set the nodes 120, a higher data throughput is possible at a smaller latency and increased transmission security. The energy consumption of the nodes 120 may be reduced and, thus, the battery lifetime may be increased in battery-operated nodes 120.

The embodiments of the present invention described above may also be applied to systems in which the frequency generator (frequency base) of the node 120 and the timer (time base) of the node 120 are coupled. In this case, the estimation of the error in the time base or the frequency base may allow drawing conclusions to the error of the respective other parameter.

Further embodiments of the present invention provide a method for bidirectional data transmission between a base station and a node. In a first step, a data packet transmitted by the node at a node transmission frequency is received, the node transmission frequency being derived from a frequency generator of the node. In a second step, the node transmission frequency is determined based on the data packet received, and a deviation of the frequency generator of the node is determined based on a frequency deviation between the determined node transmission frequency and a set node transmission frequency associated to the node. In a third step, a base station transmission frequency is set based on the determined deviation of the frequency generator of the node, and a data packet is transmitted to the node at the base station transmission frequency.

Furthermore, embodiments of the present invention provide a method for bidirectional data transmission between a base station and a node. In a first step, a data packet transmitted by the node at a node transmission frequency is received, the node transmission frequency being derived from a frequency generator of the node. In a second step, the node transmission frequency is determined based on the data packet received, and a deviation of the frequency generator of the node is determined based on a frequency deviation between the determined node transmission frequency and a set node transmission frequency associated to the node. In a third step, a data packet is transmitted to the node, the data packet exhibiting the determined deviation of the frequency generator of the node or a correction value derived therefrom.

Additionally, embodiments of the present invention provide a method for bidirectional data transmission between a base station and a node. In a first step, a data packet transmitted by the node at a node transmission point in time is received, the node transmission point in time being derived from a timer of the node. In a second step, the node transmission point in time is determined based on the data packet received, and a time deviation of the timer of the node is determined based on a time deviation between the determined node transmission point in time and a set node transmission point in time associated to the node. In a third step, a data packet is transmitted to the node, the data packet exhibiting the determined time deviation of the timer of the node or a correction value derived therefrom.

In accordance with one aspect, a base station 100 including bidirectional data transmission to a node 120 comprises: means 102 for receiving a data packet transmitted by the node 120 at a node transmission frequency, the node transmission frequency being derived from a frequency generator of the node 120; means 104 for determining the node transmission frequency based on the data packet received and for determining a deviation of the frequency generator of the node 120 based on a frequency deviation between the determined node transmission frequency and a set node transmission frequency associated to the node 120; means 106 for transmitting a data packet to the node 120 at a base station transmission frequency, the means 106 for transmitting the data packet being configured to set the base station transmission frequency based on the determined deviation of the frequency generator of the node 120.

The means 106 for transmitting the data packet may further be configured to tune the base station transmission frequency to a node receiving frequency based on the determined deviation of the frequency generator of the node 120, the node receiving frequency being derived from the frequency generator of the node 120.

According to another aspect, a system 110 for bidirectional data transmission comprises: a base station 100 including bidirectional data transmission to a node 120 comprising: means 102 for receiving a data packet transmitted by the node 120 at a node transmission frequency, the node transmission frequency being derived from a frequency generator of the node 120; means 104 for determining the node transmission frequency based on the data packet received and for determining a deviation of the frequency generator of the node 120 based on a frequency deviation between the determined node transmission frequency and a set node transmission frequency associated to the node 120; means 106 for transmitting a data packet to the node 120 at a base station transmission frequency, the means 106 for transmitting the data packet being configured to set the base station transmission frequency based on the determined deviation of the frequency generator of the node 120; and a node 120, the node 120 comprising means 122 for transmitting the data packet to the base station 100 at the node transmission frequency and means 124 for receiving the data packet from the base station 100, the means 124 for receiving the data packet from the base station 100 comprising a receiving filter having a bandwidth of less than 0.1% of the carrier frequency.

According to another aspect, a base station 100 including bidirectional data transmission to a node 120 comprises: means 102 for receiving a data packet transmitted by the node 120 at a node transmission frequency, the node transmission frequency being derived from a frequency generator of the node 120; means 104 for determining the node transmission frequency based on the data packet received and for determining a deviation of the frequency generator of the node 120 based on a frequency deviation between the determined node transmission frequency and a set node transmission frequency associated to the node 120; means 106 for transmitting a data packet to the node 120, the data packet comprising the determined deviation of the frequency generator of the node 120 or a correction value derived therefrom.

The base station 100 may further comprise means for coordinating the node 120 configured to associate the set node transmission frequency to the node 120.

The node transmission frequency may further be in an uncoordinated frequency range and the means for coordinating the node 120 may further be configured to associate the set node transmission frequency to the node 120 such that the set node transmission frequency is in a coordinated frequency range.

The means 106 for transmitting the data packet may further be configured to transmit the data packet to the node 120 at a base station transmission frequency, the base station transmission frequency being in the coordinated frequency range or at an edge of the uncoordinated frequency range.

According to another aspect, a system 110 including bidirectional data transmission comprises: a base station 100 including bidirectional data transmission to a node 120 comprising: means 102 for receiving a data packet transmitted by the node 120 at a node transmission frequency, the node transmission frequency being derived from a frequency generator of the node 120; means 104 for determining the node transmission frequency based on the data packet received and for determining a deviation of the frequency generator of the node 120 based on a frequency deviation between the determined node transmission frequency and a set node transmission frequency associated to the node 120; means 106 for transmitting a data packet to the node 120, the data packet comprising the determined deviation of the frequency generator of the node 120 or a correction value derived therefrom; and a node 120, the node 120 comprising means 122 for transmitting the data packet to the base station 100 at the node transmission frequency and means 124 for receiving the data packet from the base station 100, the means 122 for transmitting the data packet to the base station 100 being configured to set the node transmission frequency to the set node transmission frequency based on the determined deviation of the frequency generator or the correction value derived therefrom.

According to another aspect, a base station 100 including bidirectional data transmission to a node 120 comprises: means 102 for receiving a data packet transmitted by the node 120 at a node transmission point in time, the node transmission point in time being derived from a timer of the node 120; means 104 for determining the node transmission point in time based on the data packet received and for determining a time deviation of the timer of the node 120 based on a time deviation between the determined node transmission point in time and a set node transmission point in time associated to the node 120; means 106 for transmitting a data packet to the node 120, the data packet comprising the determined time deviation of the timer of the node 120 or a correction value derived therefrom.

The means 102 for receiving the data packet transmitted by the node 120 at the node transmission point in time may further be configured to receive a further data packet transmitted by the node 120 at a further node transmission point in time, the further node transmission point in time being derived from the timer of the node 120; wherein the means 104 for determining the node transmission point in time is configured to determine the further node transmission point in time based on the further data packet, the means 104 for determining the time deviation of the timer of the node 120 being configured to determine a further time deviation between the determined further node transmission point in time and a further set node transmission point in time associated to the node 120 and to determine a clock deviation of the timer of the node 120 based on the time deviation and the further time deviation; and wherein the means 106 for transmitting the data packet to the node 120 is configured to transmit the data packet to the node 120 at the determined clock deviation of the timer or comprising a correction value derived therefrom.

The means 106 for transmitting the data packet to the node 120 may further be configured to transmit the data packet to the node 120 for synchronization of a node receiving point in time at a base station transmission point in time or comprising a value derived therefrom.

The base station 100 may further comprise means for coordinating the node 120 configured to associate the set node transmission point in time to the node 120.

The means 106 for transmitting the data packet may further be configured to transmit the data packet at a base station transmission point in time, the means for coordinating the node 120 being configured to not associate the base station transmission point in time to a node 120 as the set node transmission point in time.

According to another aspect, a system 110 including bidirectional data transmission comprises: a base station 100 including bidirectional data transmission to a node 120 comprising: means 102 for receiving a data packet transmitted by the node 120 at a node transmission point in time, the node transmission point in time being derived from a timer of the node 120; means 104 for determining the node transmission point in time based on the data packet received and for determining a time deviation of the timer of the node 120 based on a time deviation between the determined node transmission point in time and a set node transmission point in time associated to the node 120; means 106 for transmitting a data packet to the node 120, the data packet comprising the determined time deviation of the timer of the node 120 or a correction value derived therefrom; and a node 120, the node 120 comprising means 122 for transmitting the data packet to the base station 100 at the node transmission point in time and means 124 for receiving the data packet from the base station 100, the means for transmitting the data packet being configured to set the node transmission point in time to the set node transmission point in time based on the determined deviation of the timer or the correction value derived therefrom.

According to another aspect, a method for bidirectional data transmission between a base station and a node comprises: receiving a data packet transmitted by the node at a node transmission frequency, the node transmission frequency being derived from a frequency generator of the node; determining the node transmission frequency based on the data packet received and determining a deviation of the frequency generator of the node based on a frequency deviation between the determined node transmission frequency and a set node transmission frequency associated to the node; and setting a base station transmission frequency based on the determined deviation of the frequency generator of the node and transmitting a data packet to the node at the base station transmission frequency.

According to another aspect, a method for bidirectional data transmission between a base station and a node comprises: receiving a data packet transmitted by the node at a node transmission frequency, the node transmission frequency being derived from a frequency generator of the node; determining the node transmission frequency based on the data packet received and determining a deviation of the frequency generator of the node based on a frequency deviation between the determined node transmission frequency and a set node transmission frequency associated to the node; and transmitting a data packet to the node, the data packet comprising the determined deviation of the frequency generator of the node or a correction value derived therefrom.

According to another aspect, a method for bidirectional data transmission between a base station and a node comprises: receiving a data packet transmitted by the node at a node transmission point in time, the node transmission point in time being derived from a timer of the node; determining the node transmission point in time based on the data packet received and determining a time deviation of the timer of the node based on a time deviation between the determined node transmission point in time and a set node transmission point in time associated to the node; transmitting a data packet to the node, the data packet comprising the determined time deviation of the timer of the node and a correction value derived therefrom.

According to another aspect, a computer program comprises program code for performing the method for bidirectional data transmission between a base station and a node comprising: receiving a data packet transmitted by the node at a node transmission frequency, the node transmission frequency being derived from a frequency generator of the node; determining the node transmission frequency based on the data packet received and determining a deviation of the frequency generator of the node based on a frequency deviation between the determined node transmission frequency and a set node transmission frequency associated to the node; and setting a base station transmission frequency based on the determined deviation of the frequency generator of the node and transmitting a data packet to the node at the base station transmission frequency, when the program runs on a computer or microprocessor.

According to another aspect, a computer program comprises program code for performing a method for bidirectional data transmission between a base station and a node comprising: receiving a data packet transmitted by the node at a node transmission frequency, the node transmission frequency being derived from a frequency generator of the node; determining the node transmission frequency based on the data packet received and determining a deviation of the frequency generator of the node based on a frequency deviation between the determined node transmission frequency and a set node transmission frequency associated to the node; and transmitting a data packet to the node, the data packet comprising the determined deviation of the frequency generator of the node or a correction value derived therefrom, when the program runs on a computer or microprocessor.

According to another aspect, a computer program comprises program code for performing a method for bidirectional data transmission between a base station and a node comprising: receiving a data packet transmitted by the node at a node transmission point in time, the node transmission point in time being derived from a timer of the node; determining the node transmission point in time based on the data packet received and determining a time deviation of the timer of the node based on a time deviation between the determined node transmission point in time and a set node transmission point in time associated to the node; transmitting a data packet to the node, the data packet comprising the determined time deviation of the timer of the node and a correction value derived therefrom, when the program runs on a computer or microprocessor.

Although some aspects have been described in connection with a device, it is to be understood that these aspects also represent a description of the corresponding method such that a block or an element of a device is also to be understood to be a corresponding method step or characteristic of a method step. In analogy, aspects having been described in connection with a method step or as a method step also represent a description of a corresponding block or detail or characteristic of a corresponding device. Some or all of the method steps may be executed by a hardware apparatus (or using a hardware apparatus), such as, for example, a microprocessor, a programmable computer or an electronic circuit. In some embodiments, some or several of the most important method steps may be executed by such an apparatus.

Depending on certain implementation requirements, embodiments of the invention may be implemented in either hardware or software. The implementation may be using a digital storage medium, such as, for example, a floppy disc, DVD, Blu-ray disc, CD, ROM, PROM, EPROM, EEPROM or FLASH memory, hard disc drive or another magnetic or optical storage on which are stored electronically readable control signals which are able to cooperate or cooperate with a programmable computer system such that the respective method will be executed. This means that the digital storage medium may be computer-readable.

Some embodiments in accordance with the invention thus include a data carrier comprising electronically readable control signals which are able to cooperate with a programmable computer system such that one of the methods described herein will be performed.

Generally, embodiments of the present invention may be implemented to be a computer program product comprising program code, the program code being operative to perform one of the methods when the computer program product runs on a computer.

The program code may exemplarily be stored on a machine-readable carrier.

Other embodiments include the computer program for performing one of the methods described herein, the computer program being stored on a machine-readable carrier. In other words, an embodiment of the inventive method consequently is a computer program comprising program code for performing one of the methods described herein when the computer program runs on a computer.

Consequently, another embodiment of the inventive method is a data carrier (or a digital storage medium or a computer-readable medium) onto which the computer program for performing one of the methods described herein has been recorded.

Another embodiment of the inventive method is thus a data stream or a sequence of signals representing the computer program for performing one of the methods described herein. The data stream or the sequence of signals may exemplarily be configured to be transferred via a data communications connection, exemplarily over the internet.

Another embodiment includes processing means, exemplarily a computer or a programmable logic device, configured or adapted to perform one of the methods described herein.

Another embodiment includes a computer on which has been installed the computer program for performing one of the methods described herein.

Another embodiment in accordance with the invention includes a device or a system implemented to transmit to a receiver a computer program for performing at least one of the methods described herein. Transmission may exemplarily takes place electronically or optically. The receiver may exemplarily be a computer, mobile device, memory device or similar device. The device or system may exemplarily include a file server for transmitting the computer program to the receiver.

In some embodiments, a programmable logic device (exemplarily a field-programmable gate array, FPGA) may be used to perform some or all of the functionalities of the methods described herein. In some embodiments, a field-programmable gate array may cooperate with a microprocessor so as to perform one of the methods described herein. Generally, the methods in some embodiments are performed on the part of any hardware device. This may be universally usable hardware, such as, for example, a computer processor (CPU), or, for the method, specific hardware, such as, for example, an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A base station comprising bidirectional data transmission to a node, comprising:
   a receiver for receiving a data packet transmitted by the node at a node transmission point in time, the node transmission point in time being derived from a timer of the node;
   a determiner for determining the node transmission point in time based on the data packet received and for determining a time deviation of the timer of the node based on a time deviation between the determined node transmission point in time and a set node transmission point in time associated to the node;
   a transmitter for transmitting a data packet to the node, the data packet comprising the determined time deviation of the timer of the node or a correction value derived therefrom;
   wherein the receiver for receiving the data packet transmitted by the node at the node transmission point in time is configured to receive a further data packet transmitted by the node at a further node transmission point in time, the further node transmission point in time being derived from the timer of the node;
   wherein the determiner for determining the node transmission point in time is configured to determine the further node transmission point in time based on the further data packet, the determiner for determining the time deviation of the timer of the node being configured to determine a further time deviation between the determined further node transmission point in time and a further set node transmission point in time associated to the node and to determine a clock deviation of the timer of the node based on the time deviation and the further time deviation;

wherein the transmitter for transmitting the data packet to the node is configured to transmit the data packet to the node at the determined clock deviation of the timer or comprising a correction value derived therefrom; and wherein the base station comprises a coordinator for coordinating the node configured to associate the set node transmission point in time to the node.

2. The base station in accordance with claim 1, wherein the transmitter for transmitting the data packet to the node is configured to transmit the data packet to the node for synchronization of a node receiving point in time at a base station transmission point in time or comprising a value derived therefrom.

3. The base station in accordance with claim 1, wherein the transmitter for transmitting the data packet is configured to transmit the data packet at a base station transmission point in time, the coordinator for coordinating the node being configured to not associate the base station transmission point in time to a node as the set node transmission point in time.

4. A system comprising bidirectional data transmission, comprising:
   a base station in accordance with claim 1; and
   a node, the node comprising a transmitter for transmitting the data packet to the base station at the node transmission point in time and a receiver for receiving the data packet from the base station, the transmitter for transmitting the data packet being configured to set the node transmission point in time to the set node transmission point in time based on the determined deviation of the timer or the correction value derived therefrom.

5. A method for bidirectional data transmission between a base station and a node, comprising:

receiving a data packet transmitted by the node at a node transmission point in time, the node transmission point in time being derived from a timer of the node;

determining the node transmission point in time based on the data packet received and determining a time deviation of the timer of the node based on a time deviation between the determined node transmission point in time and a set node transmission point in time associated to the node;

transmitting a data packet to the node, the data packet comprising the determined time deviation of the timer of the node and a correction value derived therefrom;

receiving a further data packet transmitted by the node at a further node transmission point in time, the further node transmission point in time being derived from the timer of the node;

determining the further node transmission point in time based on the further data packet and determining a further time deviation of the timer of the node based on a further time deviation between the determined further node transmission point in time and a further set node transmission point in time associated to the node;

determining a clock deviation of the timer of the node based on the time deviation and the further time deviation; and wherein transmitting the data packet to the node comprises transmitting the data packet at the determined time deviation of the timer of the node or comprising a correction value derived therefrom;

coordinating the node, wherein coordinating the node comprises associating the set node transmission point in time to the node.

6. A non-transitory computer-readable medium having instructions stored thereon, wherein the instructions, when executed by a computer or a microprocessor, perform the method in accordance with claim 5.

* * * * *